Figure 1:
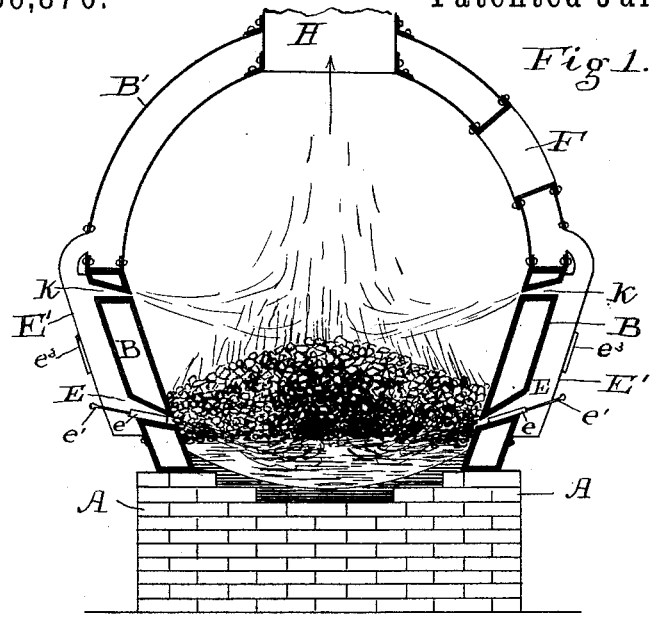

(No Model.)  2 Sheets—Sheet 1.

F. L. BARTLETT.
PROCESS OF SMELTING ORES.

No. 406,870.  Patented July 16, 1889.

Witnesses
Samuel F. Lunroy
Roger H. Moody

Inventor
Frank L. Bartlett (No Model.) 2 Sheets—Sheet 2.
F. L. BARTLETT.
PROCESS OF SMELTING ORES.
No. 406,870. Patented July 16, 1889.
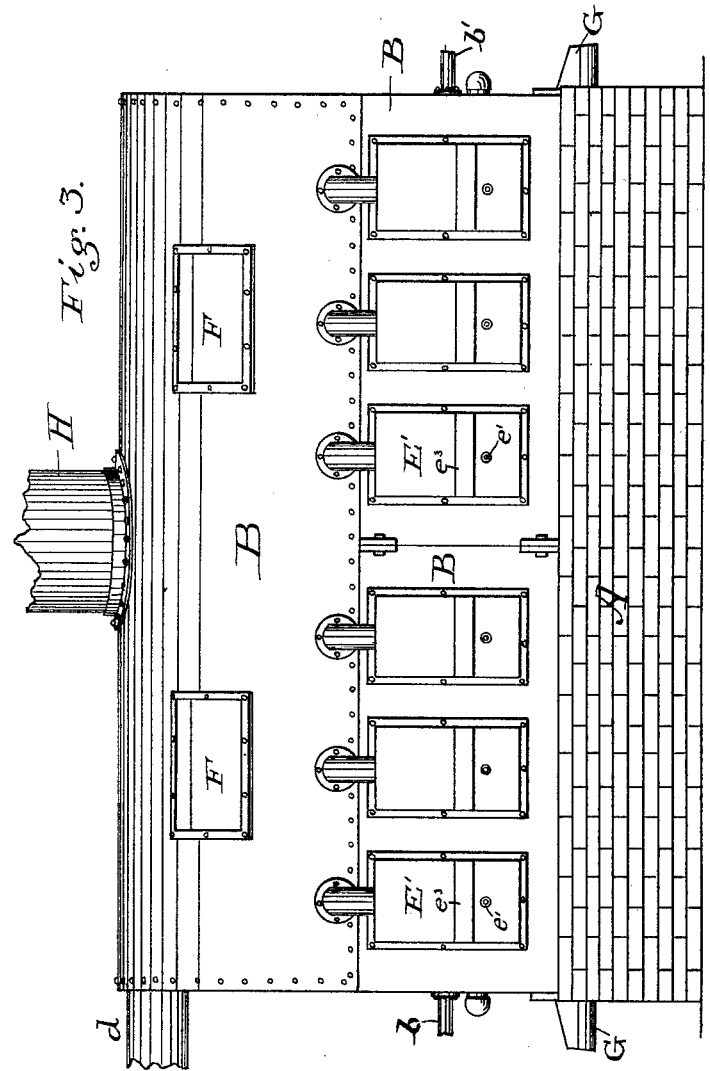
Witnesses
Severance
E. A. Finckel
Inventor
Frank L. Bartlett
by S. W. Bates
his atty

UNITED STATES PATENT OFFICE.

FRANK L. BARTLETT, OF PORTLAND, MAINE.

PROCESS OF SMELTING ORES.

SPECIFICATION forming part of Letters Patent No. 406,870, dated July 16, 1889.

Application filed March 8, 1889. Serial No. 302,518. (No model.)

*To all whom it may concern:*

Be it known that I, FRANK L. BARTLETT, a citizen of the United States, residing at Portland, in the county of Cumberland and State of Maine, have invented certain new and useful Improvements in the Process of Smelting Ores; and I do hereby declare the following to be a full, clear, and exact description of the invention, such as will enable others skilled in the art to which it appertains to make and use the same.

My invention relates to furnaces for treating copper, silver, and lead ores containing zinc and sulphur, and which are now commonly treated by the old and well-known form of cupola or blast furnace. These furnaces in common use consist of a round, square, or oblong stack with blow-holes or tuyeres at the base, which enter horizontally or incline upward, for blowing in air under slight pressure. These stacks are from ten to forty feet in height, and the ore and fuel are fed into the furnace in alternate layers and the melted product is drawn off at the bottom. The difficulties in the use of these furnaces are as follows, namely: In the first place, ores cannot be successfully treated if they contain sulphur above ten per cent. without previous roasting to expel the sulphur. All of the elements—such as sulphur, selenium, zinc, cadmium, arsenic, antimony, and to some extent lead—have a tendency to volatilize in the hot lower part of the furnace, but as they ascend and meet the cooler layers of ore and fuel in the high charge they are condensed and again settle down to form slags, mattes, and spiess, which take up portions of the precious metals—gold and silver—holding them in suspension, thus resulting in a loss in this direction. There are thus formed in the bottom of the furnace a lower layer of pure metal, a layer of matte, and one of spiess, holding in suspension portions of the precious metals and above that the slag. This matte, spiess, and slag is frequently so rich in precious metals that it must be resmelted, and its presence always acts to divert and cause loss of large quantities of gold and silver. The sulphur and zinc which it contains, so far from being utilized, is a constant source of trouble to the smelter. If a large percentage of zinc is present, it is first volatilized in the lower hot zone and then condensed by the cool upper layers, forming infusible sulphide of zinc, all of which cannot enter the slag, and which after a time collect in intensely-hard masses about the walls of the furnace, and which have to be occasionally cut away at great expense and to the detriment of the furnace. A similar difficulty is experienced when the reverberatory or hearth furnace is used. Both furnaces act by reduction, and the presence of zinc and sulphur causes losses in the same manner. So great is the loss caused by the presence of zinc that it has for many years been customary for smelters to make an extra charge for smelting ore containing above a certain quantity of zinc, and as a result there are in the mines of this country vast quantities of ore rich in the precious metals, but which will not pay for treatment, owing to the zinc sulphide contained in them.

The object of my invention is to provide a process or method of treating ores which shall obviate these difficulties of smelting and which shall quickly eliminate all the volatile compounds contained in the ore, thus separating them at once from the non-volatile metals and carrying them off in the form of fume, which can be collected and utilized, and without allowing them any opportunity to condense and settle back again to contaminate the non-volatile metals which it is desirable to save. These can be drawn off as fast as collected, while the volatile metals can be saved in the form of a valuable paint-pigment.

My invention consists of the various steps set forth in the claims. The process generally consists of burning the ore and fuel in a suitable furnace, whereby the metals are fused to form a scorifying-bath, directing an air-blast onto this bath to expel the volatile metals, and keeping up the heat in the body of ore to prevent such metals from condensing.

In the drawings I illustrate a form of furnace which is adapted to carry my process into effect, although other forms of apparatus may be designed for the same purpose.

Figure 2:
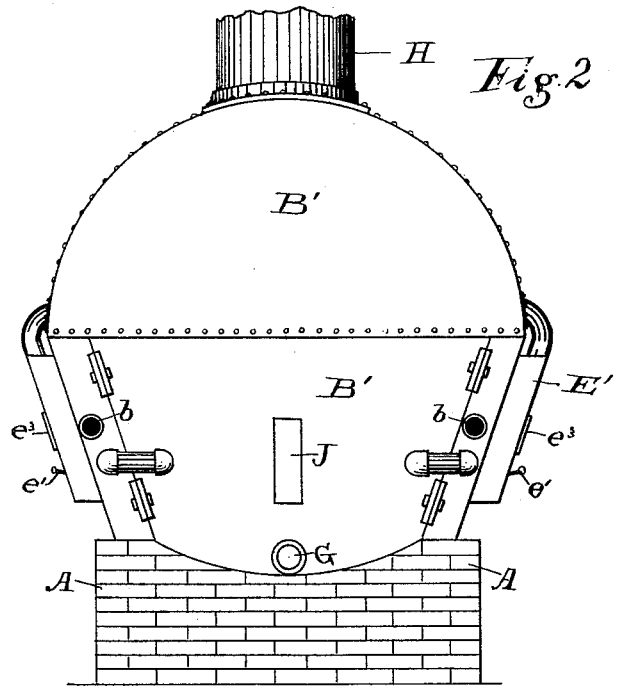

Figure 1 is a transverse section. Fig. 2 is an end view, and Fig. 3 is a side view.

A is the base on which the furnace rests, here shown as of brick, the upper portion concave in form and laid with fire-clay to form the tight hearth of the furnace. On the base rest the water-jacketed walls B of the furnace, here shown as somewhat inclined outward. The furnace is oblong in shape, having a length considerably in excess of its width. A horizontal line of tuyeres E extend through the side walls near the base, and these have a downward inclination. In practice I incline these tuyeres so that the air-jet will strike the hearth about one-third of the way across. The tuyeres on opposite sides thus incline toward each other. I get the best results by making these tuyeres, as I have here shown them, in the form of narrow longitudinal slits, as in this way I am able to cover the surface of the hearth more uniformly with air.

The tuyeres are made with an inward taper, and in each I insert a damper $e$, which is a flat piece of metal nearly or quite large enough to fill the outlet of the tuyeres when pushed entirely in, but which, when moved in and out by means of a handle $e'$, will regulate the opening of the tuyeres.

An upper set of tuyeres K, of similar construction to the lower ones, are provided near the top of the side walls, and a tight casing $E'$ incloses each lower tuyere and the upper one, which is vertically above it. This casing $E'$ is connected with the air-supply, which in this case comes from the air-space surrounding the top of the furnace, as hereinafter shown. A door or hand-hole $e^3$ is placed in the casing $E'$ opposite each tuyere to provide for its inspection.

The furnace is provided with a dome or covering $B'$, made double to form an air-space wherein the air-blast may be heated, thus utilizing the surplus heat of the furnace. This air-space connects with the several casings $E'$, thus communicating with the tuyeres, and it also connects by means of a pipe $b$ with a suitable pressure-blower. Feed-doors F—in this case two in number—are provided in the dome, and an aperture H is placed centrally in the top of the dome for the exit of the fume and gaseous products of combustion.

The pipes $b$ are the water-inlets for the water-jacketed walls, and the pipes $b'$ are the outlet-pipes. A tap-hole G is provided at each end of the furnace at the lowest point of the hearth. There is also provided at each end of the furnace a slit or opening J, twelve inches or more in length by two or three inches in width, for the purpose of introducing bars to stir up and rabble the charge. This opening is closed with clay when not in use.

In using my furnace I charge in the ore and fuel mixed together, making a layer in practice from six to eighteen inches in depth. As combustion proceeds, the non-volatile metals and rocky matters are reduced and melted and fall to the bottom, forming a shallow stratum of molten matter. The non-volatile metals—as sulphur, zinc, &c.—partially volatilize before fusion, but they mostly fuse and fall with the non-volatile metals. The heavy air-blast from the tuyeres E E is forced downward at an inclination through the ore and fuel, striking the surface of the molten matter about one-third the distance across the furnace. This blast stirs and agitates the surface of the melted metal, scorifying the melted products, zinc, and sulphur, which volatilize and pass off through the thin layer of unmelted ore in the form of fume, and thence out through the aperture H. The upper tuyeres K deliver an air-blast at the top of the ore, which serves to keep up a combustion on top, and thus prevent the body of ore from becoming cool enough to condense any of the volatile compounds which rise up through it. It also adds oxygen to the sulphur compounds, forming them into oxysulphides and oxysulphurets.

As stated, a large part of the volatile metals which have heretofore caused so much trouble, are volatilized after they have been reduced and melted by the scorifying effect of the blast on the melted stratum, and thus the non-volatile metals, which it is desired to save in as nearly pure state as possible, are continually freed from the presence of the volatile metals, and may be drawn off in a nearly pure state as they accumulate. The volatile metals pass off as fume, which is collected and refined, making a marketable pigment.

The process is a continuous one, and the ore and fuel are charged in at intervals in sufficient quantities to keep the depth of ore about constant. The quantity of air to be blown in through the tuyeres E is subject to accurate regulations by means of the dampers $e$, which, as explained, are moved out and in by the handles $e'$, according to the supply of air required.

In the scorifying process above described, and as carried out by means of my furnace, a great saving of silver is effected over any other process of smelting now in use.

By my scorifying method the zinc and silver are fused together, and then when the zinc is volatilized from the scorifying-bath by means of the air-jet, as described, it passes off in the form of fume without carrying with it any of the silver. The zinc is constantly eliminated from the silver, which settles to the bottom of the furnace with the precious metals and is drawn off.

The presence of large quantities of sulphur aids my process, by fusing and making the scorifying-bath thinner and more liquid than it otherwise would be. It is thus more thoroughly stirred by the air-blast than it would be if the melted matter were more dense. In other processes much sulphur is objectionable, since it carries large quantities of silver into the slag.

The force of the air-blast as it enters the furnace and is directed downward onto the melted matter must be great, in order to properly volatilize the zinc, &c.; hence in my apparatus it is important to regulate the supply of air at the point where it enters the furnace. In this way the jet of air will enter with undiminished velocity when the damper is partially closed. As the quantity of air admitted is liable to vary with every new charge, it is important to have ready means of opening and closing the tuyeres. This I attain by the dampers herein shown, although it is evident that various modifications can be made while keeping within the spirit of my invention.

I claim—

1. The herein-described process of treating ores containing zinc, sulphur, and other volatile metals, which consists in burning the ore mixed with fuel in a suitable furnace, whereby the non-volatile metals and a portion of the zinc, sulphur, &c., settle down and form a scorifying-bath, directing an air-blast through the superposed mass of unfused ore and fuel down onto the surface of said bath to volatilize the volatile metals, and directing an air-blast at or near the top of the body of ore to prevent the condensation of said zinc and sulphur, substantially as described.

2. The herein-described method of treating ores of the kind described, which consists of burning the ore mixed with fuel in a suitable furnace, whereby the non-volatile and a portion of the volatile metals are fused and form a scorifying-bath, directing an air-blast through the superposed mass of unfused ore and fuel down onto the surface of said bath to volatilize the volatile metals, and keeping up the heat in the unfused ore to prevent condensation of said volatile metals, substantially as described.

3. The herein-described method of treating ores of the kind described, which consists in burning the ore mixed with fuel in a suitable furnace, whereby the non-volatile and a portion of the volatile metals are fused to form a scorifying-bath, and directing an air-blast through the superposed mass of unfused ore and fuel down onto the surface of said bath for driving off said volatile metals, substantially as shown.

In testimony whereof I affix my signature in presence of two witnesses.

FRANK L. BARTLETT.

Witnesses:
  S. W. BATES,
  C. SEVERANCE.